United States Patent
Shi et al.

(10) Patent No.: US 12,039,476 B2
(45) Date of Patent: Jul. 16, 2024

(54) AGV SCHEDULING CONTROL SYSTEM AND METHOD

(71) Applicant: CONTEMPORARY AMPEREX TECHNOLOGY CO., LIMITED, Ningde (CN)

(72) Inventors: Deqiang Shi, Ningde (CN); Liyong Lin, Ningde (CN); Shurui Chen, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/137,366

(22) Filed: Apr. 20, 2023

(65) Prior Publication Data

US 2023/0325746 A1 Oct. 12, 2023

Related U.S. Application Data

(63) Continuation of application No. PCT/CN2022/086179, filed on Apr. 11, 2022.

(51) Int. Cl.
*G06Q 10/06* (2023.01)
*G06Q 10/04* (2023.01)
(Continued)

(52) U.S. Cl.
CPC ....... *G06Q 10/06316* (2013.01); *G06Q 10/04* (2013.01); *G06Q 10/063114* (2013.01); *H04L 69/16* (2013.01)

(58) Field of Classification Search
CPC ..................................................... G06Q 10/06
See application file for complete search history.

(56) References Cited

U.S. PATENT DOCUMENTS 11,084,410 B1* 8/2021 Bhaskaran .............. B66F 9/063
2014/0365258 A1* 12/2014 Vestal .................. G05D 1/0297
901/1

(Continued)

FOREIGN PATENT DOCUMENTS

CN 106210093 A 12/2016
CN 113315780 A 8/2021
(Continued)

OTHER PUBLICATIONS

Alberto Martínez-Gutiérrez, Javier Díez-González, Rubén Ferrero-Guillén, Paula Verde, Rubén Álvarez and Hilde Perez, Digital Twin for Automatic Transportation in Industry 4.0, MDPI, Basel, Switzerland, 2021. (Year: 2021).*

(Continued)

*Primary Examiner* — Kurtis Gills
(74) *Attorney, Agent, or Firm* — XSENSUS LLP

(57) ABSTRACT

The present application provides an AGV scheduling control system and method. The AGV scheduling control system includes: an AGV scheduling controller configured to generate an AGV scheduling instruction; an AGV configured to execute a task according to the AGV scheduling instruction; and a server that is communicatively coupled with the AGV scheduling controller and the AGV respectively, the server being configured to transfer messages between the AGV scheduling controller and the AGV, and provide adaptation to AGVs from different manufacturers. The AGV scheduling control system in the present application further includes a virtual AGV scheduling controller and a virtual AGV that serve as digital twins of the AGV scheduling controller and the AGV, and the programs used to control the virtual entity and the real entity are equivalently exchangeable.

23 Claims, 7 Drawing Sheets

(51) Int. Cl.
*G06Q 10/0631* (2023.01)
*H04L 69/16* (2022.01)

(56) References Cited

U.S. PATENT DOCUMENTS

| | | | | |
|---|---|---|---|---|
| 2018/0267496 A1* | 9/2018 | Wang | ................... | G05B 19/056 |
| 2021/0004009 A1* | 1/2021 | Furihata | ............... | G05D 1/0246 |
| 2021/0132583 A1* | 5/2021 | Shu | ................... | G05B 19/41805 |
| 2022/0103272 A1* | 3/2022 | Dietrich | ............. | H04B 17/3912 |

FOREIGN PATENT DOCUMENTS

| | | | | | |
|---|---|---|---|---|---|
| CN | 113759909 | A | 12/2021 | | |
| CN | 113792406 | A | 12/2021 | | |
| CN | 113867295 | A | 12/2021 | | |
| CN | 114137917 | A | 3/2022 | | |
| WO | 2022023797 | A1 | 2/2022 | | |
| WO | WO-2022023797 | A1 * | 2/2022 | .............. | B66F 9/063 |
| WO | WO-2022133330 | A1 * | 6/2022 | .............. | B25J 9/161 |

OTHER PUBLICATIONS

International Search Report issued Nov. 28, 2022 in International Patent Application No. PCT/CN2022/086179, 9 pages.
Extended European Search Report issued Apr. 5, 2024 in European Patent Application No. 22871149.5.
S. M. Jeon, et al., "Digital Twin Application for Production Optimization", 2020 IEEE International Conference on Industrial Engineering and Engineering Management (IEEM), IEEE, Dec. 14, 2020, pp. 542-545.

\* cited by examiner

AGV SCHEDULING CONTROL SYSTEM AND METHOD

CROSS-REFERENCE TO RELATED APPLICATION

This application is a continuation of PCT Patent Application No. PCT/CN2022/086179, entitled "AGV SCHEDULING CONTROL SYSTEM AND METHOD" filed on Apr. 11, 2022, which is incorporated herein by reference in its entirety.

TECHNICAL FIELD

The present application relates to the field of industrial manufacturing, and particular to an AGV scheduling control system and method.

BACKGROUND

Digitalization, networking and intelligence are the development needs and trends in the field of industrial manufacturing, wherein industrial robots are regarded as the main direction of intelligent development. AGV (automated guided vehicle, also referred to as unmanned vehicle) is one of the commonly used industrial robots, which plays an important role in enterprise digitalization and intelligent logistics, and has the effects of replacing manual handling, precise distribution, high efficiency and low cost, and many manufacturing enterprises have introduced AGV scheduling system in their production lines. The AGV scheduling system usually uses an AGV scheduling controller as a decision-making layer to schedule a plurality of AGVs for material handling.

However, for complicated production conditions of the manufacturing process, it is often necessary to introduce AGV scheduling systems from different manufacturers, which are responsible for AGV scheduling of different processes. The AGV scheduling system from each manufacturer cannot call the AGV from another manufacturer, so that the manufacturing enterprise cannot realize an overall management and control of the AGVs in the production line, which may cause a large amount of waste and efficiency loss to the production line.

SUMMARY OF THE INVENTION

In view of the foregoing problems, the present application provides an AGV scheduling control system and method, capable of resolving the compatibility problem between AGV scheduling systems from different manufacturers, and implementing overall management and control of AGVs.

According to a first aspect, the present application provides an AGV scheduling control system, including: a real AGV scheduling controller, the real AGV scheduling controller is configured to generate an AGV scheduling instruction; a real AGV, the real AGV configured to execute a task according to the AGV scheduling instruction; and a server, the server is communicatively coupled with the real AGV and the real AGV scheduling controller respectively, wherein the server is configured to: receive the AGV scheduling instruction from the real AGV scheduling controller and transmit the same to the corresponding real AGV; and receive status feedback from the real AGV.

Through the architecture of the AGV scheduling control system provided by the present application, an intermediate layer is added between the AGV decision-making layer and the AGV execution layer, and the intermediate layer is responsible for the transmission of messages, which significantly improves the communication processing capabilities of message transmission and distribution. In addition, this architecture allows integrating multiple independent AGV systems that may exist previously into a total AGV system, and scheduling and controlling all AGVs by an AGV scheduling controller to achieve overall management and control.

In some embodiments, the real AGV includes AGVs from a plurality of AGV manufacturers, and the server has a plurality of adapters corresponding to the plurality of AGV manufacturers for providing adaptation between the real AGV and the real AGV scheduling controller.

By setting adapters for different AGV manufacturers at the server, the compatibility of AGVs from different manufacturers is realized, allowing AGVs from different manufacturers to be scheduled and controlled through an AGV scheduling controller.

In some embodiments, the AGV scheduling control system further includes: a virtual AGV and a virtual AGV scheduling controller that are constructed based on simulation software and serve respectively as digital twins of the real AGV and the real AGV scheduling controller, wherein the virtual AGV and the virtual AGV scheduling controller are communicatively coupled with the server.

By establishing the digital twins of the AGV scheduling controller and AGV, the simulation of the real AGV scheduling control system can be provided during the planning phase of the production line, and the status monitoring of the real AGV scheduling control system can be provided during the operation phase of the production line.

In some embodiments, the program used in the simulation software for controlling the virtual AGV and the virtual AGV scheduling controller is equivalently exchangeable with the program for controlling the corresponding real AGV and real AGV scheduling controller.

By modeling differently from conventional digital twins, the present application can directly apply the optimized AGV scheduling logic and algorithm obtained after simulating the virtual entity to the real entity, thereby significantly shortening the time for planning and optimization processes, and realizing rapid deployment and operation of production lines.

In some embodiments, the real AGV, the real AGV scheduling controller, the virtual AGV and the virtual AGV scheduling controller have respective IP addresses and ports, and communicate with the server through the TCP/IP protocol.

By assigning respective IP addresses and ports to the real entity and the virtual entity, the peer-to-peer and unified control of the real entity and the virtual entity is realized, and the real entity and the virtual entity can be in the system at the same time without causing conflicts.

In some embodiments, generating the AGV scheduling instruction further comprises: storing a received task into a task table; acquiring an idle AGV from an AGV status list; and assigning the task to the idle AGV.

By maintaining the task table and the AGV status list, the AGV scheduling controller can globally grasp the task requirements and AGV status, comprehensively consider various factors, and determine the most suitable AGV for executing tasks, which is conducive to improving the overall efficiency of the production line.

In some embodiments, the real AGV scheduling controller is further configured to: monitor the status fed back by the AGV during task execution, and send an alarm signal when the status is inconsistent with the expectation.

By monitoring the status of the AGV, it is possible to manage and control the overall operating status of the AGV system, and optimize the scheduling logic and algorithm of the AGV system based on the fact that the recorded reality does not match the expected situation.

In some embodiments, the real AGV is schedulable by the virtual AGV scheduling controller in the same manner as the virtual AGV.

By implementing the real AGV and the virtual AGV to be scheduled by the virtual AGV scheduling controller in the same way, the fusion operation of the real entity and the virtual entity is realized, which can significantly simplify the planning and optimization process of the AGV system, thereby realizing the rapid deployment of the production line, reducing the time spent on downtime and debugging, and improving the overall production efficiency of the production line.

In some embodiments, the AGV scheduling control system further includes: a real material calling system, wherein the real material calling system is communicatively coupled with a server, and the server is further configured to: receive tasks issued by the real material calling system and transmit the same to the real AGV scheduling controller; and transmit the status fed back by the real AGV to the real material calling system.

Through the above method, the present application integrates the material calling system into the architecture of the AGV scheduling control system in a manner similar to the AGV scheduling controller and AGV, and the material calling system can communicate with other entities in a unified form, thus It can have a more comprehensive control over the material handling work, realize a more efficient scheduling algorithm, and improve the overall production efficiency of the production line.

In some embodiments, the AGV scheduling control system further includes: a virtual material calling system constructed based on simulation software as a digital twin of the real material calling system, and the virtual material calling system is communicatively coupled with the server.

By constructing a virtual material calling system, the material calling system can be included in the simulation and testing in the planning phase, and a similar virtual-real fusion operation can be realized, which speeds up the deployment of the production line.

According to a second aspect, the present application provides a method for implementing an AGV scheduling control system, including: constructing, based on simulation software, a virtual AGV and a virtual AGV scheduling controller that are digital twins of a real AGV and a real AGV scheduling controller respectively, so that the program for controlling the virtual AGV and the virtual AGV scheduling controller is equivalently exchangeable with the program for controlling the corresponding real AGV and real AGV scheduling controller; constructing a server, such that the server is communicatively coupled with the virtual AGV, the virtual AGV scheduling controller, the real AGV, and the real AGV scheduling controller respectively; simulating an AGV scheduling process by using the virtual AGV, the virtual AGV scheduling controller and the server; optimizing the program used by the virtual AGV, the virtual AGV scheduling controller and the server based on the simulation result; and applying the optimized program to the corresponding real AGV and real AGV scheduling controller.

The method provided by the present application can simplify the process from planning to operation of the AGV scheduling control system, and significantly speed up the deployment of production lines. At the same time, it is also convenient for continuous optimization after operation by virtue of the equivalent exchange between virtual entities and real entities.

In some embodiments, the real AGV comprises AGVs from a plurality of AGV manufacturers, wherein constructing the server further comprises: constructing a plurality of adapters corresponding to the plurality of AGV manufacturers for providing adaptation between the real AGV and the real AGV scheduling controller.

By constructing adapters for different AGV manufacturers at the server, compatibility of AGVs from different manufacturer is realized, allowing AGVs from different manufacturers to be scheduled and controlled through an AGV scheduling controller.

In some embodiments, the real AGV, the real AGV scheduling controller, the virtual AGV and the virtual AGV scheduling controller have respective IP addresses and ports, and communicate with the server through the TCP/IP protocol.

By assigning respective IP addresses and ports to the real entity and the virtual entity, the peer-to-peer and unified control of the real entity and the virtual entity is realized, and the real entity and the virtual entity can be in the system at the same time without causing conflicts.

In some embodiments, simulating the AGV scheduling process further includes: configuring the virtual AGV scheduling controller to generate an AGV scheduling instruction; configuring the virtual AGV to execute a task according to the AGV scheduling instruction; and configuring the server to: receive the AGV scheduling instruction from the virtual AGV scheduling controller and transmit the same to corresponding virtual AGV; and receive the status feedback from the virtual AGV.

Through the simulation of the actual AGV scheduling process, the AGV scheduling planning algorithm and program can be tested and debugged in the planning phase, so as to reduce the time spent on planning and optimization process.

In some embodiments, generating the AGV scheduling instruction further comprises: storing a received task into a task table; acquiring an idle virtual AGV from an AGV status list; and assigning the task to the idle virtual AGV.

By maintaining the task table and the AGV status list, the AGV scheduling controller can globally grasp the task requirements and AGV status, comprehensively consider various factors, and determine the most suitable AGV for executing tasks, which is conducive to improving the overall efficiency of the production line.

In some embodiments, the virtual AGV scheduling controller is further configured to: monitor the status fed back by the AGV during task execution and send an alarm signal when the status is inconsistent with the expectation.

Through the digital twin of the virtual part, the operating status of the real entity can be monitored in real time and an alarm can be sent in time to remind operators to pay attention.

In some embodiments, the virtual AGV scheduling controller is capable of scheduling the real AGV in the same manner as scheduling the virtual AGV.

Through the construction of a virtual environment, it is possible to plan and test every detail of the actual working process and interaction process of the AGV scheduling controller and the AGV, wherein the interaction process is through the server as a communication intermediary. In this way, the simulation of the AGV scheduling process can be completed, so that subsequent optimization can be carried out based on the simulation results and finally applied to the corresponding real entities to achieve rapid deployment of the production line.

In some embodiments, the method further includes: constructing a virtual material calling system as a digital twin of the real material calling system based on simulation software, so that the program used to control the virtual material calling system is equivalently exchangeable with the program used to control the corresponding real material calling system, the real material calling system and the virtual material calling system are communicatively coupled with the server respectively, and simulating the AGV scheduling process further includes: receiving a task issued by the virtual material calling system and transmitting the same to the virtual AGV scheduling controller; and transmitting the status fed back by the virtual AGV to the virtual material calling system.

By constructing a virtual material calling system corresponding to a real material calling system, the material calling system can be included in simulation and testing in the planning phase, so that testing and searching for a more efficient AGV scheduling algorithm becomes possible.

According to a third aspect, an AGV scheduling control method is provided, including: an AGV scheduling controller receiving a task via a server; the AGV scheduling controller determining an AGV for executing the task; the AGV scheduling controller sending a scheduling instruction for the AGV to the server; the server converting the scheduling instruction into a message format suitable for the AGV; and the server sending the converted scheduling instruction to the AGV.

Through the AGV scheduling control method of the present application, the compatibility problem of AGVs from different manufacturers is solved, and the unified scheduling and overall control of the AGVs on the production line can be realized.

In some embodiments, the method further includes: monitoring the operating status of the corresponding object through the virtual AGV and the virtual AGV scheduling controller that are digital twins of the AGV and the AGV scheduling controller respectively.

By establishing the digital twins of the AGV scheduling controller and AGV, the simulation of the real AGV scheduling control system can be provided during the planning phase of the production line, and the status monitoring of the real AGV scheduling control system can be provided during the operation phase of the production line.

In some embodiments, the method further includes: simulating the AGV scheduling process through the virtual AGV, the virtual AGV scheduling controller, and the server; and optimizing the AGV scheduling algorithm based on the simulation results.

By modeling differently from conventional digital twins, the present application can directly apply the optimized AGV scheduling logic and algorithm obtained after simulating the virtual entity to the real entity, thereby significantly shortening the time for planning and optimization processes, and realizing rapid deployment and operation of production lines.

In some embodiments, the task includes material calling tasks issued by the material calling system via the server.

By constructing a virtual material calling system, the material calling system can be included in the simulation and testing in the planning phase, and a similar virtual-real fusion operation can be realized, which speeds up the deployment of the production line.

According to the AGV scheduling control system and method in the present application, interactions between the AGV scheduling controller and AGV model, the device end loading and unloading model, and the material calling system can be rapidly simulated and implemented in the planning phase, and the logic of the AGV scheduling system can be verified; in the AGV operation phase, different AGV scheduling architectures from different AGV manufacturers may be adapted, and AGV communication interfaces from different AGV manufacturers may be adapted, so as to reduce the interface adaptation time between the AGV scheduling controller and the AGV; in the AGV operation phase, a digital twin of the AGV scheduling control system may be constructed by using the real entities and the corresponding virtual entities of the AGV scheduling controller, the AGV, and the material calling system, through communicating the synchronization status in real time, and based on this, continuous analysis and optimization of AGV scheduling strategy can be performed.

The above description is only a summary of the technical solutions of the present application. In order to be able to understand the technical means of the present application more clearly, the technical means can be implemented according to the content of the specification. Furthermore, to make the above and other objectives, features and advantages of the present application more comprehensible, specific implementations of the present application are exemplified below.

DESCRIPTION OF DRAWINGS

In order to illustrate the technical solutions of the embodiments of the present application more clearly, the drawings required in the embodiments of the present application will be briefly introduced below. Obviously, the drawings described below are only some embodiments of the present application. For those of ordinary skill in the art, other drawings can also be obtained according to the drawings without any creative effort.

Figure 1:
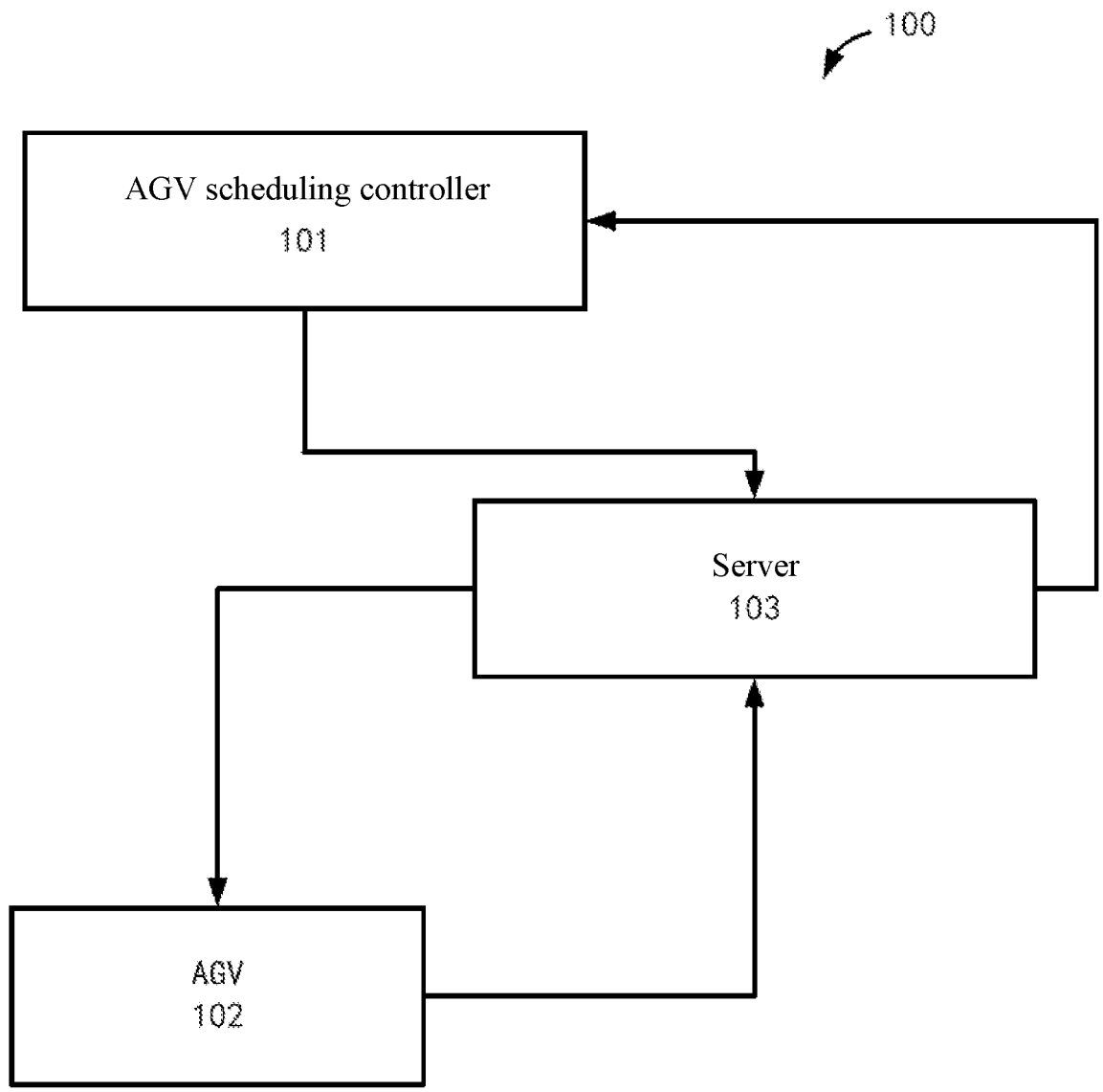
FIG. 1 is an example architectural diagram of an AGV scheduling control system according to an embodiment of the present application.

In the drawings, the drawings are not drawn to actual scale.

DETAILED DESCRIPTION

The implementations of the present application will be further described with reference to the accompanying drawings and embodiments. The following detailed description of the embodiments and the drawings are used to illustrate the principles of the present application by way of example, but should not be used to limit the scope of the present application, that is, the present application is not limited to the described embodiments.

In the description of the present application, it should be noted that, unless otherwise stated, "plurality of" means two or more; the orientation or positional relationships indicated by the terms "upper", "lower", "left", "right", "inner" and "outer" are only for facilitating the description of the present application and simplifying the description, rather than indicating or implying that the apparatus or element referred to must have a particular orientation or be constructed and operated in a particular orientation, and therefore will not be interpreted as limiting the present application. In addition, the terms "first", "second", "third", and the like are used for descriptive purposes only, and cannot be understood as indicating or implying relative importance. "Vertical" is not strictly vertical, but within an allowable range of error. "Parallel" is not strictly parallel, but within an allowable range of error.

The orientational words in the following description are directions shown in the figures, and are not intended to limit the specific structure of the present application. In the description of the present application, it should be further noted that the terms "mount", "connected", and "connect" should be understood in a broad sense, unless specified or defined otherwise, for example, it may be a fixed connection, a detachable connection, or may be an integrated connection; and it may be directly connected or indirectly connected through an intermediate medium. For those of ordinary skill in the art, the specific meanings of the above terms in the present application may be understood according to specific circumstances.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present application, the term "and/or" is only an association relationship for describing associated objects, indicating that three relationships may exist. For example, A and/or B may represent three situations: A exists alone, both A and B exist, and B exists alone. In addition, the character "I" herein generally means that the associated objects before and after it are in an "or" relationship.

With the development of digitalization and intelligent technologies in the field of industrial manufacturing, AGV systems (also referred to as AGV scheduling system, used interchangeably herein) have been widely used in modern high-end manufacturing enterprises to replace manual handling. However, in the case where the production process and procedures involved in the product are very complex, there are a wide variety of objects with different sizes/weights need to be handled by AGV, and the handling distances and routes are complicate. Therefore, regions may be divided according to needs, and independent AGV systems are used in different regions. In addition, it is often necessary to use AGV systems from different manufacturers according to different tasks. In this case, there are multiple AGV systems from the same or different manufacturers in a single production line, whereas these AGV systems, especially the AGV systems from different manufacturers, cannot schedule each other, for example, an AGV scheduling controller from manufacturer A cannot schedule an AGV from manufacturer B. The common reasons for inability to schedule are that the AGV scheduling instruction formats from different manufacturers are not compatible, the communication protocols are not compatible, etc. Moreover, the AGV systems from different manufacturers may have different architectures, for example, AGV scheduling controllers from some manufacturers are called as server, and AGVs are called as client, while AGV scheduling systems from some other manufacturers are just opposite. This causes the manufacturers cannot overall manage and control all AGV systems in the production line, including overall task scheduling, route planning, status monitoring, feedback optimization, etc.

In addition, the scheduling program of the current AGV scheduling system usually wrote according to actual deployment and requirements of the production line, then testing is performed through actual operation, and the scheduling program is modified according to the test results. This kind of program writing and optimization process of the AGV scheduling is cumbersome and not efficient.

To resolve the foregoing problem, the present application provides an improved AGV scheduling control system and method, and an implement method of the AGV scheduling control system. More specifically, the present application provides a brand new AGV scheduling control system architecture. A communication server is added between the AGV scheduling controller and the AGV, which is responsible for adaptation between AGV systems from different manufacturers, so that the AGV scheduling controller can schedule all AGVs deployed in a production line. On the basis of this architecture, access to a material calling system can also be supported, so that the working status of the material calling system can also be included in management and control, and used for scheduling and optimization of the whole production line. In addition, in the present application, the scheduling and control programs of the virtual AGV system can be written based on industrial simulation software, and these programs are equivalently exchangeable with programs used to control a real AGV system. On one hand, the AGV system can be simulated and optimized in the planning and design phase of a production line, and the optimized program can be equivalently and rapidly applied to the real AGV system, on the other hand, a digital twin of the AGV system can be realized, and the operating status of the real AGV system can be synchronously monitored.

According to an embodiment of the present application, refer to FIG. 1, FIG. 1 is an example architectural diagram of an AGV scheduling control system 100 according to an embodiment of the present application. As shown in FIG. 1, the AGV scheduling control system 100 includes: a real AGV scheduling controller 101, the real AGV scheduling controller 101 may be configured to generate an AGV scheduling instruction; a real AGV 102, the real AGV 102 may be configured to execute a task according to the AGV scheduling instruction; and a server 103, the server 103 may be communicatively coupled with the real AGV 102 and the real AGV scheduling controller 101 respectively. The server 103 may be configured to receive the AGV scheduling instruction from the real AGV scheduling controller 101 and transmit the same to the corresponding real AGV 102, and receive status feedback from the real AGV 102.

In the context of the present application, "real" is opposite to "virtual". A "real" entity, such as the real AGV scheduling controller 101 and the real AGV 102, refers to a hardware device in the real environment, for example, the real AGV 102 refers to an AGV that actually moves in a production line and executes a material handling task, and the real AGV scheduling controller 101 refers to an AGV scheduling controller that actually schedules and controls the real AGV 102 in the production line. In contrast to the "real" entity, the "virtual" entity refers to a simulation model which is corresponding to the "real" entity and is established in a simulation environment, for example, a virtual AGV scheduling controller and a virtual AGV is respectively corresponding to a real AGV scheduling controller and a real AGV.

The AGV scheduling controller is a decision-making unit (also referred to as the decision-making layer) of the AGV scheduling control system, and is responsible for scheduling and controlling the AGV. More specifically, the AGV scheduling controller may maintain an AGV status list that records the latest status of all AGVs managed by the AGV scheduling controller. The AGV scheduling controller may receive a task request from other entities, such as a material calling task request from a material calling system, a charging task request from an AGV, and so on. According to the received task request, the AGV scheduling controller may decide an AGV to execute the corresponding task and generate an AGV scheduling instruction for the AGV. The AGV scheduling instruction may include instructions related to task execution of the AGV, such as specific movement instructions, including, for example, segment traveling, steering, stopping, waiting, etc., as well as instructions for executing an action task, e.g., loading task, unloading task, charging tasks, etc.

The AGV (also referred to as AGV trolley) is a handling robot (also referred to as a logistics robot) that specifically executes a material handling task in the AGV scheduling control system, and is an execution unit (also referred to as execution layer) of the AGV scheduling control system. The AGV itself has a control unit and an execution mechanism, and the control unit may control the execution mechanism of the AGV to perform a corresponding action according to a received AGV scheduling instruction, such as moving, steering, adjusting travel speed, and so on. It can be understood that although only one AGV 102 is shown in FIG. 1, a plurality of AGVs, for example, several, tens of, or hundreds of AGVs may be arranged in the actual production line, and the number of AGVs may be determined according to production requirements.

The AGV scheduling controller and the AGV each have a communication unit for communicating with each other, for example, the AGV scheduling controller sends an AGV scheduling instruction to the AGV, and the AGV continuously feeds back its own real-time status to the AGV scheduling controller. In the architecture of the existing AGV system, the AGV scheduling controller directly communicates with the AGV, that is, the architecture is only divided into two layers, i.e., a decision-making layer and an execution layer. Unlike the prior art, in the present application, an intermediate layer, namely, the server 103, is added between the decision-making layer and the execution layer. The server 103 may be responsible for transmitting messages among entities in the AGV scheduling control system. The AGV scheduling controller 101 and the AGV 102 may be communicatively coupled with the server 103, respectively. In the architecture of the present application, an AGV scheduling instruction generated by the AGV scheduling controller 101 is first sent to the server 103, and then the server 103 forwards the instruction to the corresponding AGV 102. Similarly, the status feedback of the AGV 102 is also sent to the server 103 and forwarded to the AGV scheduling controller 101 or other entities, such as the material calling system by the server 103.

Through the architecture of the AGV scheduling control system provided by the present application, an intermediate layer is added between the AGV decision-making layer and the AGV execution layer, and the intermediate layer is responsible for the transmission of messages, which significantly improves the communication processing capabilities of message transmission and distribution. In addition, this architecture allows integrating multiple independent AGV systems that may exist previously into a total AGV system, and scheduling and controlling all AGVs by an AGV scheduling controller to achieve overall management and control.

In some embodiments, the real AGV 102 includes AGVs from a plurality of AGV manufacturers, and the server 103 has a plurality of adapters corresponding to the plurality of AGV manufacturers for providing adaptation between the real AGV and the real AGV scheduling controller.

Figure 2:
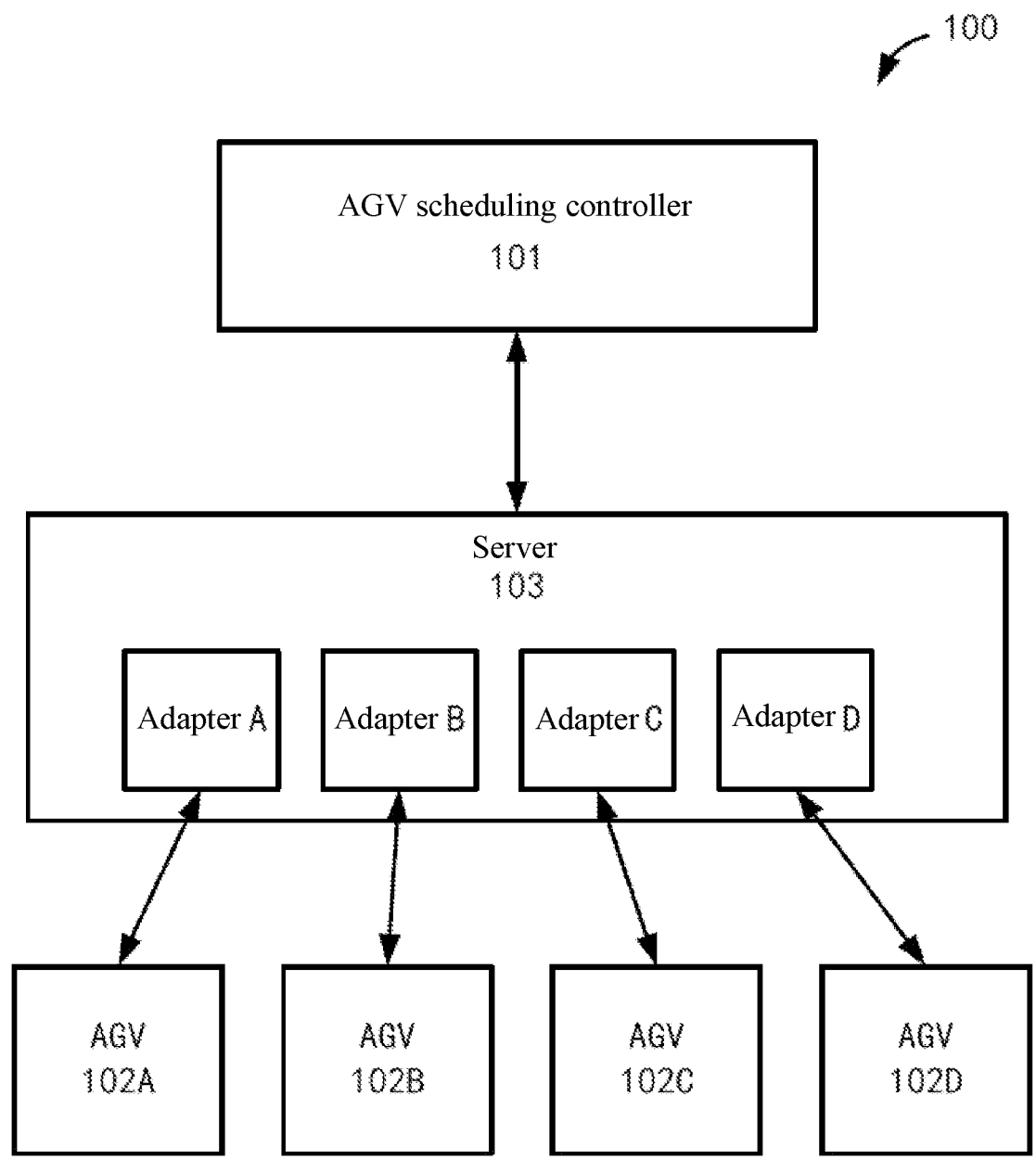
FIG. 2 is an example architectural diagram illustrating an AGV scheduling control system involving AGVs from different manufacturers according to an embodiment of the present application.

FIG. 2 is an example architectural diagram illustrating an AGV scheduling control system involving AGVs from different manufacturers according to an embodiment of the present application. As mentioned previously, since different processes are involved in a production line, it is often necessary to use AGVs from different manufacturers. As an example, FIG. 2 shows that a system including AGVs from four manufacturers, respectively, manufacturer A, manufacturer B, manufacturer C, and manufacturer D, labeled as 102A, 102B, 102C, and 102D. These manufacturers may have different instruction sets, message formats, communication protocols, etc. In the architecture of the present application, the server 103 provides adaptation of instructions and messages for AGVs from different manufacturers. As shown in FIG. 2, the server 103 has adapters in one-to-one correspondence with the manufacturers, including adapter A, adapter B, adapter C, and adapter D. Each adapter may be responsible for conversion adaptation of messages between the AGV and the AGV scheduling controller, e.g., converting the AGV scheduling instruction in a common format issued by the AGV scheduling controller into a particular format of the respective manufacturer AGV system, and converting the feedback message of the AGV back to the common format used by the AGV scheduling controller. In addition, the problem that architectures of the AGV system adopted by different manufacturers are different is also solved in the adaptation process. For example, the original definition of client and server of the AGV system by different manufacturers may be opposite. After using the architecture of the present application, for the server, both the AGV scheduling controller and the AGV are merely communication entities, and there is no need to distinguish whether it is a client or a server, only needs to process and transmit messages by using a network identifier (for example, IP address).

By setting adapters for different AGV manufacturers at the server, the compatibility of AGVs from different manufacturers is realized, allowing AGVs from different manufacturers to be scheduled and controlled through an AGV scheduling controller.

In some embodiments, the AGV scheduling control system further includes: a virtual AGV and a virtual AGV scheduling controller that are constructed based on simulation software and serve respectively as digital twins of the real AGV and the real AGV scheduling controller, wherein the virtual AGV and the virtual AGV scheduling controller are communicatively coupled with the server.

Simulation software is a common tool in the field of industrial manufacturing, and is used for modeling a real entity by a computer, simulating the logic and work thereof, and is usually used for analyzing and evaluating a simulation result by performing simulation before actually deployed in a production line, and optimizing the production line according to the analysis and evaluation result. Commonly used simulation software includes PlantSimulation, Flexsim, etc.

Digital twin is a simulation process that integrates multi-disciplinary, multi-physical quantity, multi-scale and multi-probability by using data such as physical model, sensor update and operation history, which completes mapping in a virtual space so as to reflect an entire life cycle process of a corresponding physical equipment, and is often used in the field of intelligent manufacturing in recent years. By performing virtual mapping on real objects in a factory or production line, the real objects can be simulated, and the real-time status of the real objects can also be synchronized and used as monitoring for the real objects.

Figure 3:
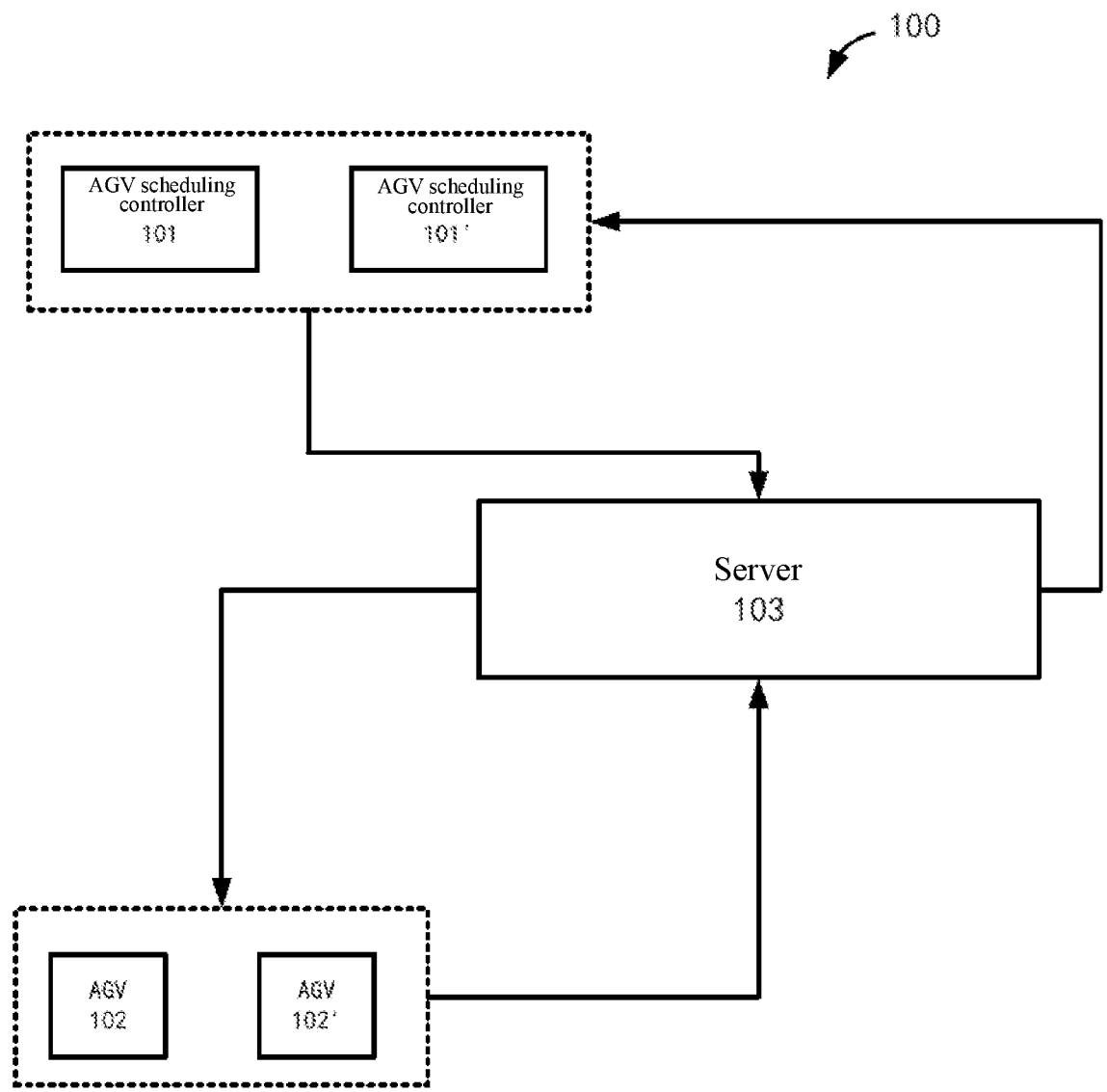
FIG. 3 is an example architectural diagram illustrating an AGV scheduling control system according to another embodiment of the present application.

FIG. 3 shows an example architectural diagram of an AGV scheduling control system 100 according to another embodiment of the present application. In the embodiment shown in FIG. 3, a virtual AGV scheduling controller 101' corresponding to the real AGV scheduling controller 101 and a virtual AGV 102' corresponding to the real AGV 102 may be constructed in the simulation software. The virtual AGV scheduling controller 101' and the virtual AGV 102' are coupled to the server 103 in the same manner as the real AGV scheduling controller 101 and the real AGV 102.

By establishing the digital twins of the AGV scheduling controller and AGV, the simulation of the real AGV scheduling control system can be provided during the planning phase of the production line, and the status monitoring of the real AGV scheduling control system can be provided during the operation phase of the production line.

In some embodiments, the program used in the simulation software for controlling the virtual AGV and the virtual AGV scheduling controller is equivalently exchangeable with the program for controlling the corresponding real AGV and real AGV scheduling controller.

In the conventional digital twin technology, when modeling a real entity, it is usually only required that the virtual entity to be as consistent as possible with the real entity in terms of appearance size, running and operation logic, for example, the movement speed of the virtual AGV is defined just the same as the movement speed of the real AGV, the real AGV will move forward by 10 meters after receiving an instruction of moving forward by 10 meters, and the virtual AGV is configured to move forward by 10 meters after receiving the same instruction. However, the real AGV needs to move in the real world by writing a control program, for example, after receiving an instruction, the control unit of the AGV further needs to issue an instruction to the execution mechanism of the AGV, so that the movement of the AGV can be specifically implemented. The conventional digital twin virtual AGV does not need to further simulate the internal execution process thereof, only needs to be presented as moving forward by 10 meters in the virtual environment. Therefore, after performing simulating and optimization for the production line, it is still necessary to rewrite specific programs for the real entity to implement the control logic and algorithm obtained from the simulation process.

In an embodiment of the present application, in the simulation software, the virtual entity is implemented as using the same control program as the real entity in a modeling process of the real AGV and the real AGV scheduling controller, so that control programs of the two parts is equivalently exchangeable with each other. For example, for the server 103, there is no substantive difference between the scheduling instruction sent to the real AGV 102 and the scheduling instruction sent to the virtual AGV 102' except that the receiver is different. After receiving the AGV scheduling instruction, the virtual AGV 102' performs the same processing according to the scheduling instruction by using the same program, and there is no substantive difference between the message fed back by the virtual AGV 102' and by the real AGV 102.

By modeling differently from conventional digital twins, the present application can directly apply the optimized AGV scheduling logic and algorithm obtained after simulating the virtual entity to the real entity, thereby significantly shortening the time for planning and optimization processes, and realizing rapid deployment and operation of production lines.

In some embodiments, the real AGV, the real AGV scheduling controller, the virtual AGV and the virtual AGV scheduling controller have respective IP addresses and ports, and communicate with the server through the TCP/IP protocol.

As mentioned before, the real AGV 102, the real AGV scheduling controller 101, the virtual AGV 102' and the virtual AGV scheduling controller 101' are communicatively coupled to the server 103, respectively. As an example, a common TCP/IP protocol can be used between each entity and the server 103, and each entity has a unique IP address, and a communication connection with the server 103 may be established through the Socket connection.

By assigning respective IP addresses and ports to the real entity and the virtual entity, the peer-to-peer and unified control of the real entity and the virtual entity is realized, and the real entity and the virtual entity can be in the system at the same time without causing conflicts.

In some embodiments, generating the AGV scheduling instruction further comprises: storing the received task into a task table; acquiring an idle AGV from an AGV status list; and assigning the task to the idle AGV.

The AGV scheduling controller 101 may maintain the task table. The task table may store all the to-be-executed tasks received by the AGV scheduling controller 101, for example, a material calling task from a material calling system, including loading and unloading tasks. Optionally, each task in the task table has various information related to the task, including but not limited to: issuer of the task, release time, requested execution time, urgency degree, importance degree, task description, and the like.

The AGV scheduling controller 101 may maintain an AGV status list at the same time. The latest state of all AGVs are stored in the status list, and the status may include at least two statuses of idle and task execution. Optionally, the status may further includes task execution progress, remaining power of AGV, current position of AGV, and the like. The AGV status in the AGV status list may be updated in time with the real-time status feedback of the AGV. The AGV scheduling controller 101 allocates tasks in the task table based on the AGV status in the AGV status list. For example, the AGV scheduling controller 101 may determine the next task to be performed from the task table based on release time of the task, urgency degree, importance degree, and the like. An AGV suitable for executing the task is determined from the currently idle AGVs according to various properties of this task, such as which type of AGV is needed, starting point position, etc. According to an embodiment, it is possible to determine that to which AGV the task is assigned under the principle of improving the overall efficiency of the production line. In one example, candidate AGVs meeting the task requirements may be selected from the idle AGV list first, then the AGV whose current position is closest to the starting point of the task is selected from the candidate AGVs that meet the requirements to execute the task. In an alternative example, in addition to considering currently idle AGVs as candidates, AGVs that are about to complete the current task may also be taken into consideration, because there may also be some AGVs, the time required to perform the next task after completing the current task is less than the time required for all the currently idle AGVs to perform this task, for example, the destination position of the AGV that is about to complete the current task is the start position of this task. In addition, the factors that may be considered in the process of determining an AGV also including remaining power of an AGV, the traffic congestion situation on the way of an AGV to the starting point of the task, and so on. These factors can be comprehensively considered, and finally through continuous optimization and adjustment in the simulation environment, continuously improved task allocation logic and algorithm can be obtained, so that the overall efficiency of the production line is improved. After determining a specific AGV for executing the next task, the AGV scheduling controller 101 generates a scheduling instruction therefor.

By maintaining the task table and the AGV status list, the AGV scheduling controller can globally grasp the task requirements and AGV status, comprehensively consider various factors, and determine the most suitable AGV for executing tasks, which is conducive to improving the overall efficiency of the production line.

In some embodiments, the real AGV scheduling controller is further configured to: monitor the status fed back by the AGV during task execution, and send an alarm signal when the status is inconsistent with the expectation.

The AGV itself is not autonomous, and is only configured to operate according to a scheduling instruction generated by an AGV scheduling controller. Therefore, the AGV scheduling controller needs to formulate specific instructions of each step for the AGV. For example, the AGV scheduling instruction is not a general instruction which instructs an AGV to move to a particular device and execute loading or unloading task, but specific instructions such as moving, steering, stopping, and executing an action, etc. in a step-by-step manner. Therefore, the status of each step of the AGV is predictable for the AGV scheduling controller. As the AGV continuously feeds back latest status thereof, the AGV scheduling controller may monitor whether the AGV works normally in comparison with the expected status. Once the status of the AGV is found to be inconsistent with the expectation, an alarm signal may be sent. The alarm signal may be presented to a human administrator in the production line, who will further judge and decide a corresponding processing method. Optionally, the alarm signal may also be recorded for reference during subsequent optimization.

Optionally, status monitoring for the AGV may also be implemented in a digital twin environment. For example, the status of virtual AGV is synchronized based on the status feedback of corresponding real AGV, the virtual AGV scheduling controller may compare and monitor this status with the expected status, and send an alarm signal in the digital twin environment when it is found that the status of the AGV is inconsistent with the expected status.

By monitoring the status of the AGV, it is possible to manage and control the overall operating status of the AGV system, and optimize the scheduling logic and algorithm of the AGV system based on the fact that the recorded reality does not match the expected situation.

In some embodiments, the real AGV is schedulable by the virtual AGV scheduling controller in the same manner as the virtual AGV.

As mentioned before, the virtual AGV and the virtual AGV scheduling controller of the present application are modeled as digital twins of the corresponding real entities, and are implemented to be able to controlled by the same program. In addition, the virtual entity and the real entity being communicatively coupled with the server in the same manner including having respective IP addresses and ports thereof. Thus, the real entity and the virtual entity may be online at the same time, and moreover, the real entity and the virtual entity are equivalently exchangeable. For example, it is can be realized that the virtual AGV scheduling controller 101' schedules and controls the real AGV 102, or the real AGV scheduling controller 101 schedules and controls the virtual AGV 102', that is, "virtual-real fusion", because in the architecture of the present application, there is no substantial difference between the real entity and the virtual entity from the perspectives of each real entity, the virtual entity, and the server, no matter in terms of architecture, program, instruction or message. This manner is particularly beneficial to the optimization and debugging of AGV system. For example, for the problem existing in the operation of the real AGV system, after the adjustment is performed, the virtual AGV scheduling controller and the virtual AGV can be used for simulation and testing in the simulation environment, and then the virtual AGV can be replaced with the real AGV, that is, the virtual AGV scheduling controller directly controls the real AGV to perform real environment testing, and if the test results are satisfactory, the optimized algorithm can be formally applied to the formal AGV scheduling controller, and if not satisfactory, the adjustment and testing process above can be repeated. Similarly, when a new AGV is introduced, the virtual AGV can also be scheduled with the existing real AGV in a mixed manner, so as to test whether it will have an adverse impact on the existing AGV. In addition, it is conceivable that, in the case where the real entity and the virtual entity in the present application are equivalently exchangeable, the real AGV scheduling controller may schedule the virtual AGV in the same manner as scheduling the real AGV.

By implementing the real AGV and the virtual AGV to be scheduled by the virtual AGV scheduling controller in the same way, the fusion operation of the real entity and the virtual entity is realized, which can significantly simplify the planning and optimization process of the AGV system, thereby realizing the rapid deployment of the production line, reducing the time spent on downtime and debugging, and improving the overall production efficiency of the production line.

In some embodiments, the AGV scheduling control system further includes: a real material calling system, wherein the real material calling system is communicatively coupled with a server, and the server is further configured to: receive tasks issued by the real material calling system and transmit the same to the real AGV scheduling controller; and transmit the status fed back by the real AGV to the real material calling system.

As mentioned before, in the field of intelligent manufacturing, the main purpose of AGV system is material handling, and therefore the main interactive object of the AGV system is the material calling system. The material calling system issues material calling tasks to the AGV scheduling controller, including loading task and unloading task. The AGV scheduling controller performs the task according to the call task scheduling AGV. However, in the current production line, both the material calling system and the AGV scheduling system are independent from each other, that is, the material calling system is only responsible for issuing tasks, while the AGV scheduling system is only responsible for scheduling the AGV according to the received task, from the perspective of the overall production efficiency of the production line, such arrangement is not optimal.

Figure 4:
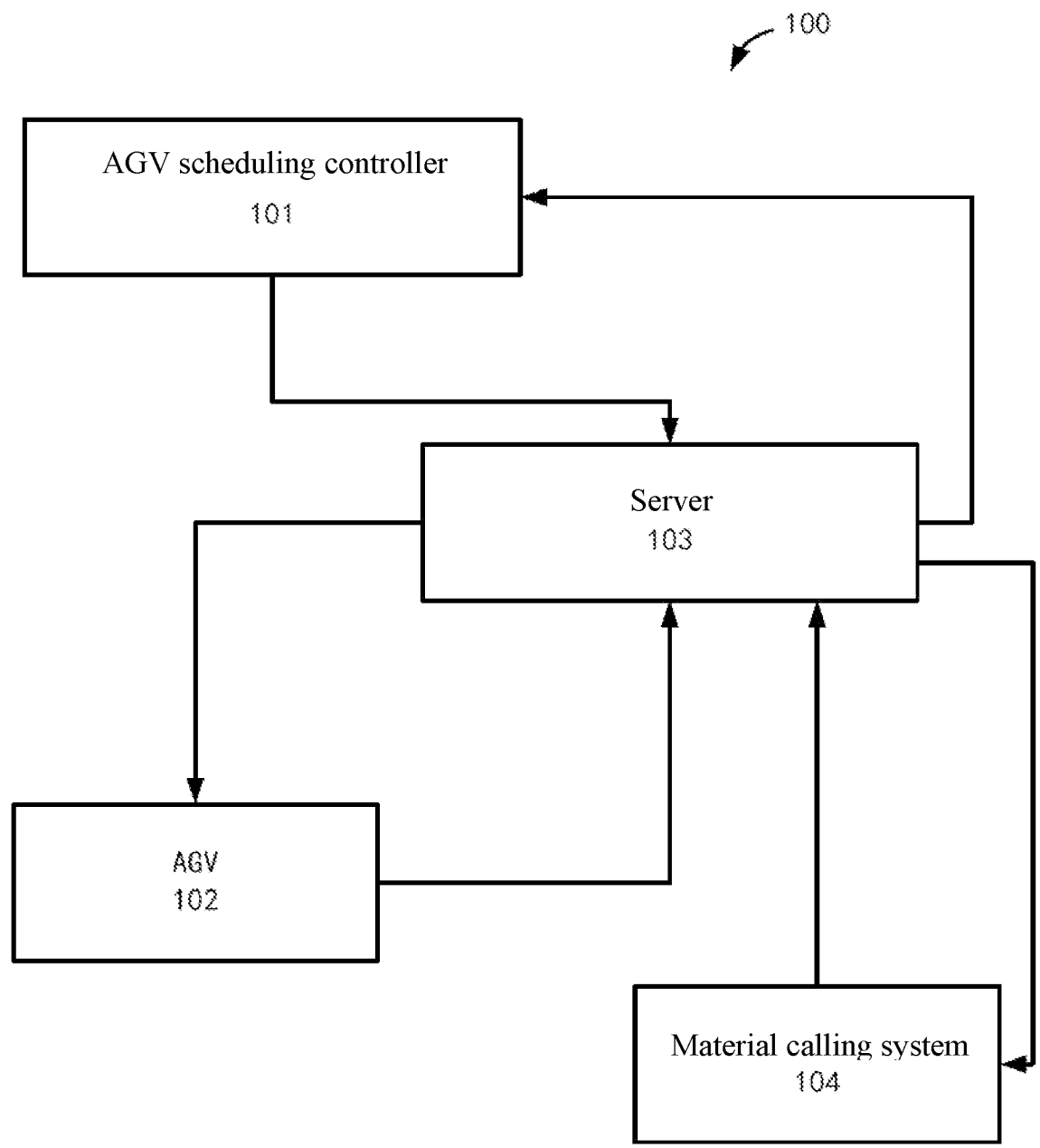
FIG. 4 is an example architectural diagram illustrating an AGV scheduling control system according to still another embodiment of the present application.

For this reason, in the present application, the material calling system is included in the architecture in a similar manner with the AGV scheduling controller and the AGV. FIG. 4 shows an example architectural diagram of an AGV scheduling control system 100 according to still another embodiment of the present application. As shown in FIG. 4, the AGV scheduling control system 100 further includes a real material calling system 104. The real material calling system 104 may also be communicatively coupled with a server 103 as an entity. Thus, the real material calling system 104 may send an issued task to the server 103, which is forwarded by the server 103 according to the message receiver specified in the task. For example, the real material calling system 104 issues a material calling task to the AGV scheduling controller 101 in a conventional manner, then, a request message containing this material calling task is sent to the server 103, in which the real AGV scheduling controller 101 is designated as the message receiver. The server 103 forwards the task request message to the real AGV scheduling controller 101. In anther aspect, the real AGV 102 will feed back the status in real time during task execution, and the status feedback message may also be forwarded to the real material calling system 104 via the server 103.

In addition, the real material calling system 104 may also inform the real AGV scheduling controller 101 of its own status via the server 103. Thus, the AGV scheduling controller may know the state of task execution at the material calling system and the status of the material calling system, such as remaining amount of material. Therefore, during scheduling, the AGV scheduling controller can not only consider the AGVs currently in idle status, but also take the AGVs that are about to end the previous task into account, for example. The AGV scheduling system may also predict the release of the material calling task of the material calling system based on the remaining amount of material in the material calling system, and therefore, measures such as pre-scheduling may be adopted to further optimize the overall efficiency of the production line.

Through the above method, the present application integrates the material calling system into the architecture of the AGV scheduling control system in a manner similar to the AGV scheduling controller and AGV, and the material calling system can communicate with other entities in a unified form, thus It can have a more comprehensive control over the material handling work, realize a more efficient scheduling algorithm, and improve the overall production efficiency of the production line.

In some embodiments, the AGV scheduling control system further includes: a virtual material calling system constructed based on simulation software as a digital twin of the real material calling system, and the virtual material calling system is communicatively coupled with the server.

Similar to the modeling for the AGV scheduling controller and the AGV, in the present application, the real material calling system 104 may also be modeled in the simulation software, a virtual material calling system 104' may be constructed as a digital twin of the real material calling system 104. Similarly, all aspects of the virtual material calling system 104' are the same as the real material calling system 104, and may be equivalently replaced with the real material calling system 104, including the fusion operation of the real and virtual entities.

By constructing a virtual material calling system, the material calling system can be included in the simulation and testing in the planning phase, and a similar virtual-real fusion operation can be realized, which speeds up the deployment of the production line.

Figure 5:
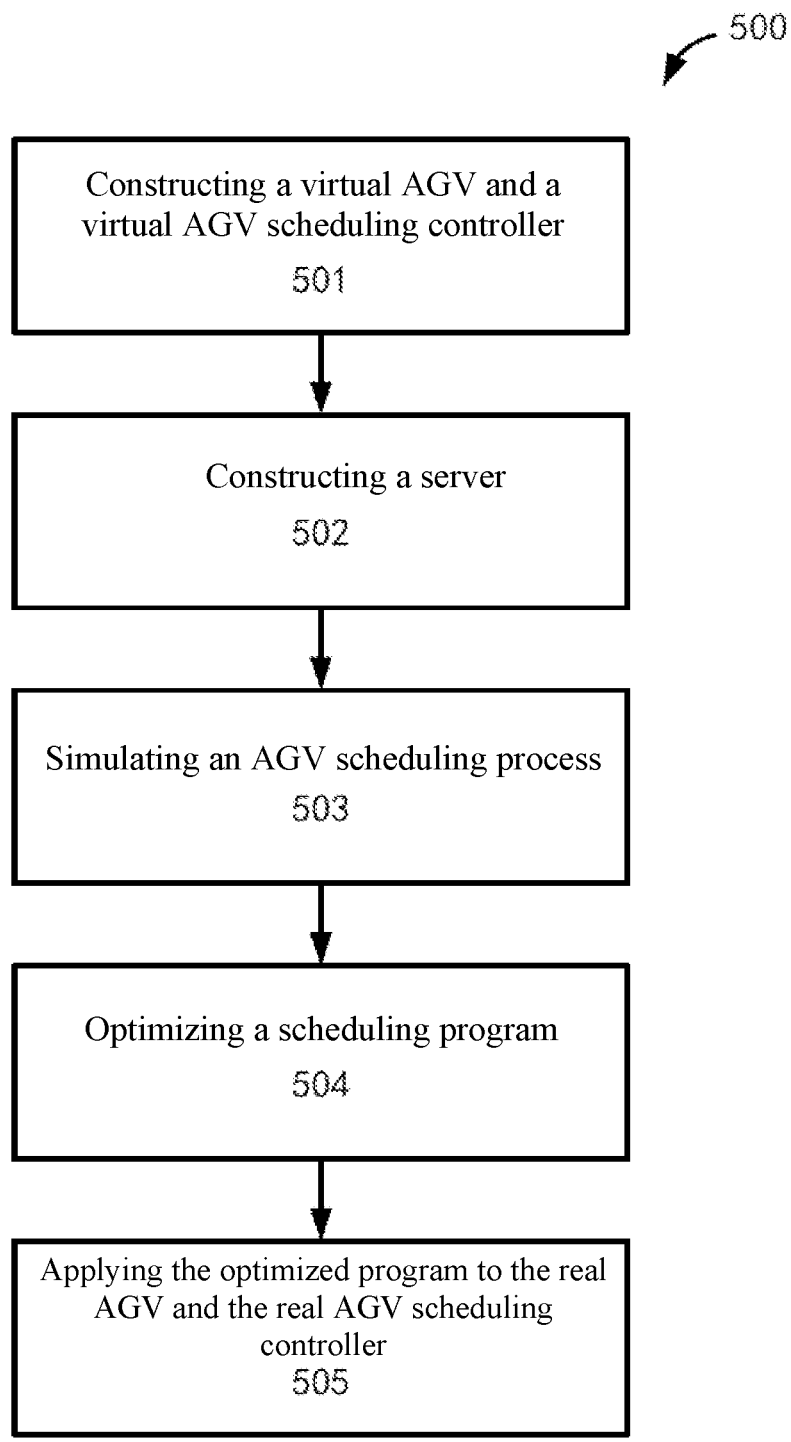
FIG. 5 is an example flowchart illustrating a method for implementing an AGV scheduling control system according to an embodiment of the present application.

According to another embodiment of the present application, please refer to FIG. 5, FIG. 5 is an example flowchart of method 500 for implementing an AGV scheduling control system according to an embodiment of the present application. As shown in FIG. 5, the method 500 starts at step 501, constructing a virtual AGV and a virtual AGV scheduling controller as digital twins of the real AGV and the real AGV scheduling controller respectively based on the simulation software, so that the program for controlling the virtual AGV and the virtual AGV scheduling controller is equivalently exchangeable with the program for controlling the corresponding real AGV and real AGV scheduling controller. At step 502, a server is constructed so that the server is communicatively coupled with the virtual AGV, the virtual AGV scheduling controller, the real AGV, and the real AGV scheduling controller, respectively. At step 503, the AGV scheduling process is simulated by using the virtual AGV, the virtual AGV scheduling controller, and the server. At step 504, the program used by the virtual AGV, the virtual AGV scheduling controller and the server are optimized based on the simulation result. Finally, at step 505, the optimized program is applied to the corresponding real AGV and real AGV scheduling controller.

Constructing a virtual entity corresponding to the real entity based on the simulation software includes performing modeling with reference to the real entity in the simulation software. Different from the conventional modeling, in the present application, a manner that is equivalently exchangeable with a real entity is used to write the control program when modeling. For example, not only the logic and parameters of the external performance of the real entity are defined and rules are written, the program of the bottom layer of the entity is written identically as well, so that the virtual entity has no difference with the real entity in software layer, therefor, a program that passes the test in the simulation environment can be directly applied to the real entity. In this way, a virtual AGV scheduling controller 101' and a virtual AGV 102' as described in FIGS. 1-4 can be constructed.

The server 103 may be constructed as a separate hardware entity, such as in the form of a separate communication server. Alternatively, the server 103 may be constructed as a software program running on a server and dedicated to the AGV scheduling control system. In one embodiment, the server 103 may be written in Python language. In one embodiment, the server 103 may also be implemented on one hardware entity with the real AGV scheduling controller, for example, the real AGV scheduling controller may be implemented as another software program running on the same server.

After the virtual AGV scheduling controller, the virtual AGV, and the server are constructed, a complete AGV scheduling control system can be built in a simulation environment. Based on this AGV scheduling control system, the AGV scheduling algorithm can be planned, and a simulation testing can be performed.

Based on the test result, the AGV scheduling algorithm and the control program of each entity may be optimized. Optimization can be performed repeatedly by modifying the scheduling algorithm, relevant parameters, thresholds, rules, routes, etc., or a combination thereof with the purpose of improving the overall production efficiency of the production line. After the expected production efficiency of the production line is obtained, the virtual AGV scheduling controller and the virtual AGV control program may be fixed and transplanted to the corresponding real entity.

The method provided by the present application can simplify the process from planning to operation of the AGV scheduling control system, and significantly speed up the deployment of production lines. At the same time, it is also convenient for continuous optimization after operation by virtue of the equivalent exchange between virtual entities and real entities.

In some embodiments, the real AGV comprises AGVs from a plurality of AGV manufacturers, wherein constructing the server further comprises: constructing a plurality of adapters corresponding to the plurality of AGV manufacturers for providing adaptation between the real AGV and the real AGV scheduling controller.

By constructing adapters for different AGV manufacturers at the server, compatibility of AGVs from different manufacturers is achieved, allowing AGVs from different manufacturers to be scheduled and controlled through an AGV scheduling controller.

In some embodiments, the real AGV, the real AGV scheduling controller, the virtual AGV and the virtual AGV scheduling controller have respective IP addresses and ports, and communicate with the server through the TCP/IP protocol.

By assigning respective IP addresses and ports to the real entity and the virtual entity, the peer-to-peer and unified control of the real entity and the virtual entity is realized, and the real entity and the virtual entity can be in the system at the same time without causing conflicts.

In some embodiments, simulating the AGV scheduling process further includes: configuring the virtual AGV scheduling controller to generate an AGV scheduling instruction; configuring the virtual AGV to execute a task according to the AGV scheduling instruction; and configuring the server to: receive the AGV scheduling instruction from the virtual AGV scheduling controller and transmit the same to corresponding virtual AGV; and receive the status feedback from the virtual AGV.

In some embodiments, generating the AGV scheduling instruction further includes: storing a received task into a task table; obtaining an idle AGV from a AGV status list; and assigning the task to the idle AGV.

In some embodiments, the virtual AGV scheduling controller is further configured to: monitor the status fed back by the AGV during task execution and send an alarm signal when the status is inconsistent with the expectation.

In some embodiments, the virtual AGV scheduling controller is capable of scheduling the real AGV in the same manner as scheduling the virtual AGV.

Through the construction of a virtual environment, it is possible to plan and test every detail of the actual working process and interaction process of the AGV scheduling controller and the AGV, wherein the interaction process is through the server as a communication intermediary. In this way, the simulation of the AGV scheduling process can be completed, so that subsequent optimization can be carried out based on the simulation results and finally applied to the corresponding real entities to achieve rapid deployment of the production line.

In some embodiments, the method further includes: constructing a virtual material calling system as a digital twin of the real material calling system based on simulation software, so that the program used to control the virtual material calling system is equivalently exchangeable with the program used to control the corresponding real material calling system, the real material calling system and the virtual material calling system are communicatively coupled with the server respectively, and simulating the AGV scheduling process further includes: receiving a task issued by the virtual material calling system and transmitting the same to the virtual AGV scheduling controller; and transmitting the status fed back by the virtual AGV to the virtual material calling system.

Similar to the AGV scheduling controller and the AGV, the present application also constructs a virtual material calling system corresponding to the real material calling system, and the two are also equivalently exchangeable. By constructing a virtual material calling system, the material calling system can be included into the simulation and the test in the planning phase, so that it is possible to test and find a more efficient AGV scheduling algorithm.

Figure 6:
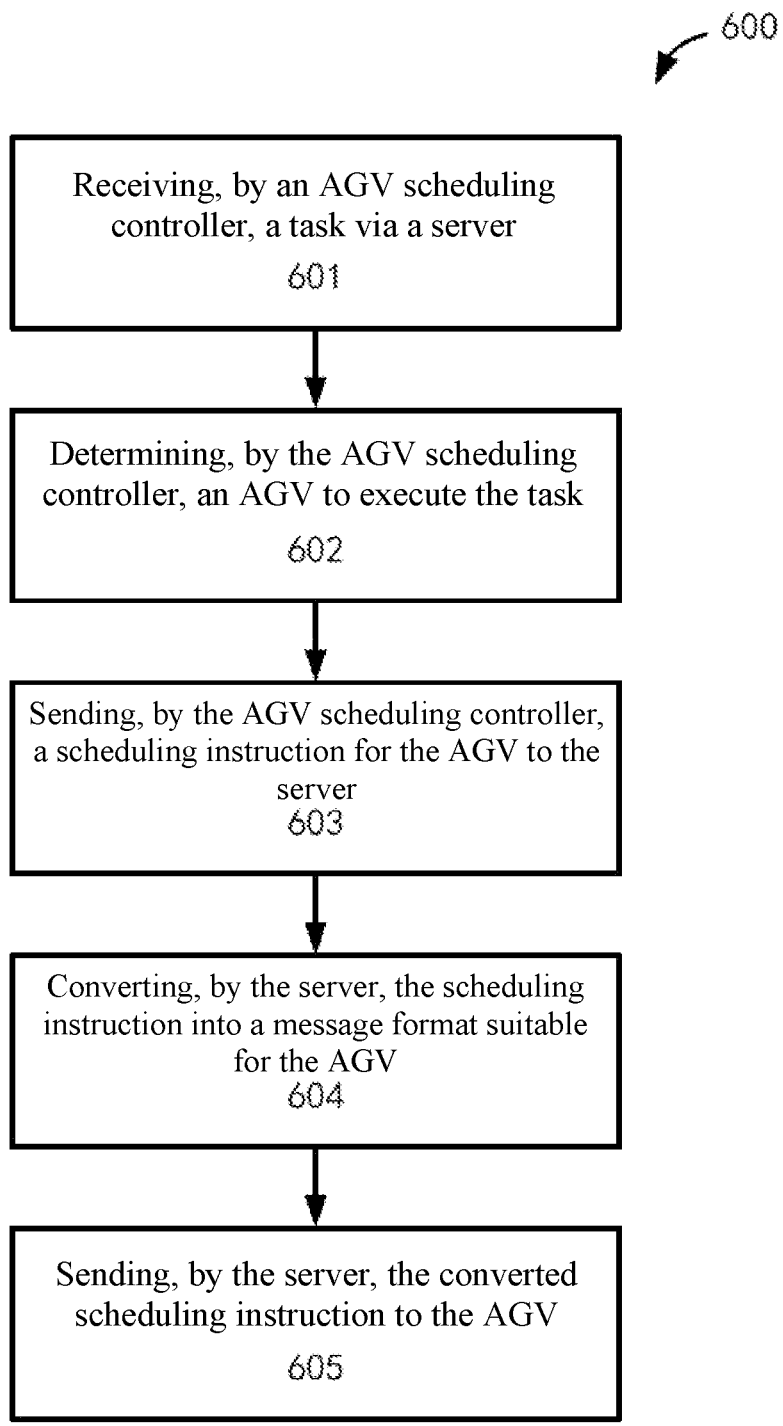
FIG. 6 is an example flowchart illustrating an AGV scheduling control method 600 according to an embodiment of the present application.

According to still another embodiment of the present application, please refer to FIG. 6, FIG. 6 is an example flowchart of an AGV scheduling control method 600 according to an embodiment of the present application. As shown in FIG. 6, the method 600 starts at step 601 where an AGV scheduling controller receives a task via a server. At step 602, the AGV scheduling controller determines an AGV to execute the task. At step 603, the AGV scheduling controller sends a scheduling instruction for the AGV to the server. At step 604, the server converts the scheduling instruction into a message format suitable for the AGV. Finally, at step 605, the server sends the converted scheduling instruction to the AGV.

The AGV scheduling control method in the present application may be performed on the AGV scheduling control system in the present application. As described above, the AGV scheduling control system of the present application includes an AGV scheduling controller, a server, and an AGV, and the AGV scheduling controller and the AGV are communicatively coupled with the server. Unlike the conventional AGV system, in the present application, the AGV scheduling controller may control and schedule AGVs from different manufacturers, the AGV scheduling controller may generate a scheduling instruction in a common format, and then the scheduling instruction may be adapted by a server, converted into a message format suitable for the AGV, and then forwarded to the corresponding AGV.

Through the AGV scheduling control method of the present application, the compatibility problem of AGVs from different manufacturers is solved, and the unified scheduling and overall control of the AGVs on the production line can be realized.

In some embodiments, the method further includes: monitoring the operating status of the corresponding object through the virtual AGV and the virtual AGV scheduling controller that are digital twins of the AGV and the AGV scheduling controller respectively.

As described above, in the present application, before the AGV system is deployed, virtual entities corresponding to real entities are constructed first, including a virtual AGV and a virtual AGV scheduling controller, where the virtual entity and the real entity may constitute a digital twin. In the operation phase, the virtual AGV and the virtual AGV scheduling controller may synchronize the status of the corresponding entity, so that the operation status monitoring for the real entity object may be realized.

In some embodiments, the method further includes: simulating the AGV scheduling process through the virtual AGV, the virtual AGV scheduling controller, and the server; and optimizing the AGV scheduling algorithm based on the simulation results.

As described above, the virtual AGV and the virtual AGV scheduling controller may realize equivalent replacement with corresponding real entities, and therefore in the planning phase, the scheduling process of the AGV system (including task generation, task allocation, path planning, etc., which may also be collectively referred to as AGV scheduling algorithm, etc.) may be simulated through the virtual AGV, the virtual AGV scheduling controller, and the server. Based on the simulation result, the AGV scheduling algorithm may be optimized.

According to the method of the present application, rapid development of an AGV scheduling control system can be realized, and deployment time from planning to operation can be shortened.

In some embodiments, the task includes material calling tasks issued by the material calling system via the server.

As described above, the AGV scheduling controller receiving a task request, wherein the task includes the material calling task issued by the material calling system. The material calling system is communicatively coupled with the server in the same manner as the AGV scheduling controller and the AGV, and exchange messages via the server.

According to the method of the present application, the material calling system may be added to an AGV scheduling control system so as to realize more efficient AGV scheduling and improve overall production efficiency of the production line.

Embodiments

Figure 7:
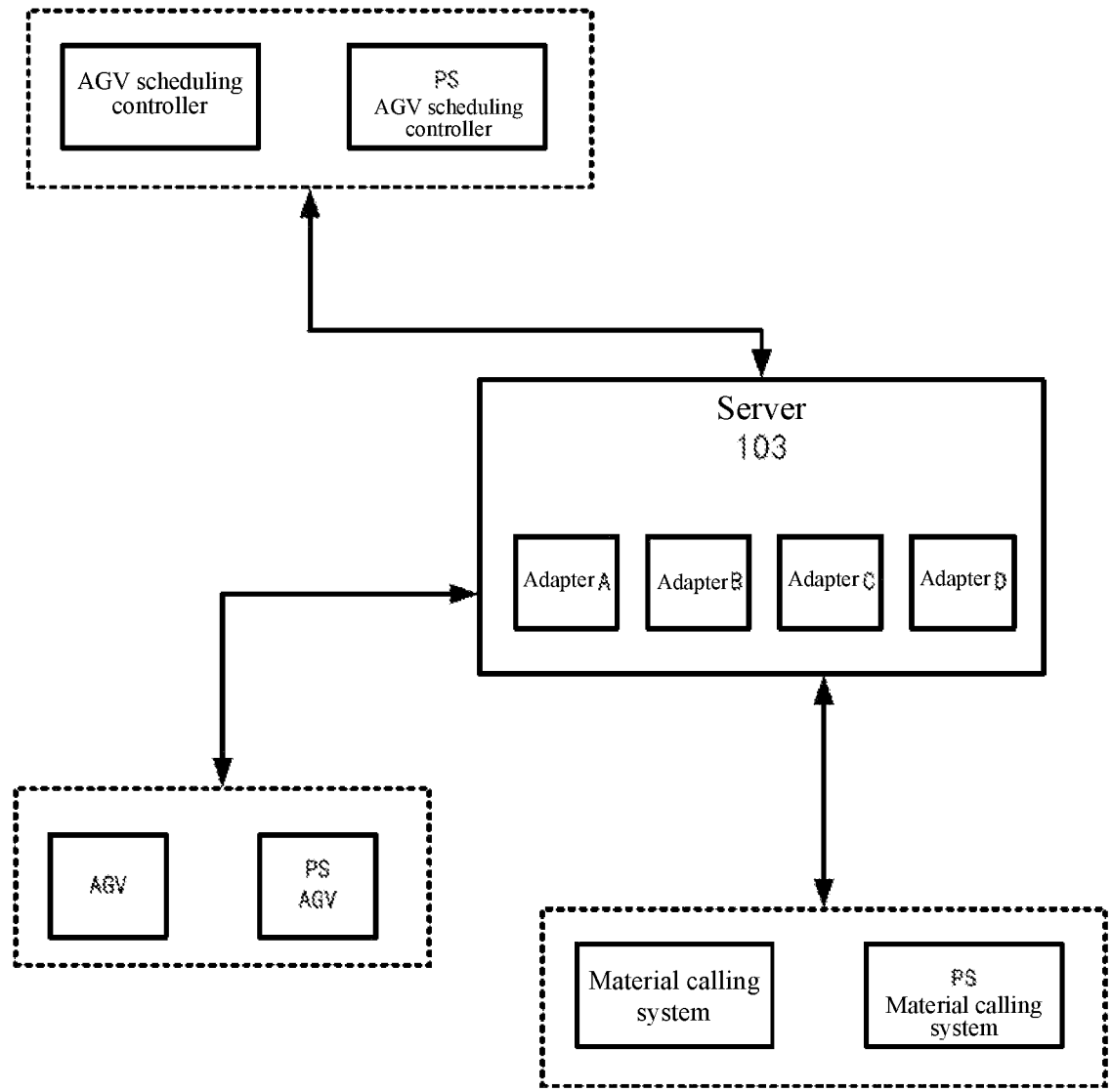
FIG. 7 is an example architectural diagram illustrating an AGV scheduling control system according to an embodiment of the present application.

FIG. 7 shows an example architectural diagram of an AGV scheduling control system according to an embodiment of the present application. The system is composed of four parts: a server, an AGV controller, an AGV, and a material calling system. The AGV controller, the AGV and the material calling system each have a corresponding virtual entity PS AGV controller, PS AGV and PS material calling system, which are modeled by the PlantSimulation simulation software. Each real entity and virtual entity are communicatively connected to a server, and the server serves as an intermediary for communication between the entities. The main difference between each real entity and the virtual entity merely lies in that the program of the real entity runs in a hardware device, while the program of the virtual entity runs in the PlantSimulation simulation environment, and there is no substantive difference between the real entity and the virtual entity from the perspective of software. Therefore, for ease of description, unless otherwise specified below, when an entity is mentioned, it refers to both of the real entity and the virtual entity. For example, an AGV controller refers to both the real AGV controller and the virtual AGV controller, because there is no difference between them in terms of function and program.

AGV is a trolley used to execute handling tasks. In this example, AGVs from four different manufacturers are used in the system. In the planning and design phase, since there is no corresponding scenario to verify the AGV scheduling system, the verification of AGV needs to be performed in a simulation environment; in the operation phase, the real AGV may replace the PS AGV for real AGV movement and control. In an AGV, a plurality of routines may be included, including but not limited to: M_Move, used to receive instructions from the AGV scheduling controller through TCP/IP protocol of Socket to perform AGV movement task; M_Load, used to indicate that the AGV reaches the loading position to perform loading; M_UnLoad, used to indicate that the AGV reaches the unloading position to perform unloading; M_Sendmessage, used to send a corresponding processing result to the server through TCP/IP protocol of Socket.

The AGV scheduling controller is responsible for scheduling the AGV. In an AGV scheduling controller, a plurality of routines may be included, including but not limited to: M_Request, used to receive a loading or unloading task sent by a material calling system, and store the task into a t Request table; M_GetAGV, used to get idle AGVs in a t_Agv table; M_Doorder, used to assign a task to an idle AGV; M_Sendmessage, used to send a task for moving an AGV to the AGV model through TCP/IP protocol of Socket, and send a result of corresponding processing information to the server. After the AGV moves a specified distance, if it is found that to be inconsistent with the expectation, an alarm signal will be sent to request processing.

The material calling system requests AGV from the AGV scheduling controller according to loading and unloading requirements of each device. In a material calling system, a plurality of routines may be included, including but not limited to: M_callloadMU, used to issue a loading task; M_callunloadMU, used to issue an unloading task; M_callmove, used to issue a moving task; M_Sendmessage, used to send a message to the AGV scheduling controller through TCP/IP protocol of Socket to allocate a task, and send a corresponding processing result to the server.

The server is written in Python and serves as background of the communication server of the AGV scheduling control system. The IP addresses and ports of the AGV scheduling controller, the AGV, and the material calling system can be automatically obtained through the server. In a preferred example, the server may develop with a function that can start scheduling simulation by one key, and synchronously start the Socket of each entity to ensure that communication of tasks, information, and data can be realized between entities. In addition, dedicated adapters for different AGV suppliers are configured in the server, which are responsible for the conversion and unification of instruction and message formats between AGV and AGV scheduling controller from each supplier and the material calling system.

While the present application has been described with reference to the preferred embodiments, various modifications may be made, and components therein may be replaced with equivalents without departing from the scope of the present application. In particular, the technical features mentioned in the various embodiments can be combined in any manner as long as there is no structural conflict. The present application is not limited to the specific embodiments disclosed herein, but rather includes all technical solutions falling within the scope of the claims.

What is claimed is:

1. An AGV scheduling control system, comprising:
   a real AGV scheduling controller, the real AGV scheduling controller being configured to generate an AGV scheduling instruction;

a real AGV, the real AGV being configured to execute a task according to the AGV scheduling instruction; and a server, the server being communicatively coupled between the real AGV and the real AGV scheduling controller respectively, wherein the server is configured to:

receive an AGV scheduling instruction from the real AGV scheduling controller and transmit the same AGV scheduling instruction to a corresponding real AGV; and receive status feedback from the real AGV and transmit the same status feedback to the real AGV scheduling controller, wherein the real AGV scheduling controller communicates to the real AGV only indirectly via the server, the server comprises an adapter to convert the AGV scheduling instruction in a common format issued by the AGV scheduling controller into a particular format of the real AGV, and convert the status feedback of the AGV back to the common format of the AGV scheduling controller, the AGV scheduling control system further comprises a real material calling system, the real material calling system is communicatively coupled with the server, and the real material calling system is configured to:

issue material calling tasks to the real AGV scheduling controller via the server, the material calling tasks including a loading task and an unloading task;

inform the real AGV scheduling controller of status of the real material calling system including remaining amount of material in the real material calling system via the server; and receives status of task execution in real time from the real AGV via the server.

2. The AGV scheduling control system according to claim 1, wherein the real AGV comprises AGVs from a plurality of AGV manufacturers, and the server has a plurality of adapters corresponding to the plurality of AGV manufacturers for providing adaptation between the real AGV and the real AGV scheduling controller.

3. The AGV scheduling control system according to claim 1, wherein the AGV scheduling control system further comprises:

a virtual AGV and a virtual AGV scheduling controller that are constructed based on simulation software and serve respectively as digital twins of the real AGV and the real AGV scheduling controller, wherein the virtual AGV and the virtual AGV scheduling controller are communicatively coupled with the server.

4. The AGV scheduling control system according to claim 3, wherein the program used in the simulation software for controlling the virtual AGV and the virtual AGV scheduling controller is equivalently exchangeable with the program used for controlling the corresponding real AGV and real AGV scheduling controller.

5. The AGV scheduling control system according to claim 3, wherein the real AGV, the real AGV scheduling controller, the virtual AGV, and the virtual AGV scheduling controller have respective IP addresses and ports, and communicate with the server through the TCP/IP protocol.

6. The AGV scheduling control system according to claim 1, wherein generating the AGV scheduling instruction further comprises:

storing a received task into a task table;
acquiring an idle AGV from an AGV status list; and
assigning the task to the idle AGV.

7. The AGV scheduling control system according to claim 1, wherein the real AGV scheduling controller is further configured to:

monitor the status fed back by an AGV during task execution, and send an alarm signal when the status is inconsistent with the expectation.

8. The AGV scheduling control system according to claim 3, wherein the real AGV is schedulable by the virtual AGV scheduling controller in the same manner as the virtual AGV.

9. The AGV scheduling control system according to claim 1, wherein the server is further configured to:
receive tasks issued by the real material calling system and transmit the same to the real AGV scheduling controller; and transmit the status fed back by the real AGV to the real material calling system.

10. The AGV scheduling control system according to claim 9, wherein the AGV scheduling control system further comprises: a virtual material calling system constructed based on simulation software as a digital twin of the real material calling system, and the virtual material calling system is communicatively coupled with the server.

11. A method for implementing an AGV scheduling control system, comprising:

constructing, based on simulation software, a virtual AGV and a virtual AGV scheduling controller as digital twins of a real AGV and a real AGV scheduling controller respectively, so that the program for controlling the virtual AGV and the virtual AGV scheduling controller is equivalently exchangeable with the program for controlling the corresponding real AGV and real AGV scheduling controller;

constructing a server such that the server is communicatively coupled between the virtual AGV and the virtual AGV scheduling controller, and between the real AGV and the real AGV scheduling controller respectively;

simulating an AGV scheduling process by using the virtual AGV, the virtual AGV scheduling controller, and the server;

optimizing the program used by the virtual AGV, the virtual AGV scheduling controller and the server based on the simulation result;

applying the optimized program to the corresponding real AGV and real AGV scheduling controller;

issuing material calling tasks to the real AGV scheduling controller via the server, the material calling tasks including a loading task and an unloading task;

informing the real AGV scheduling controller of status of the real material calling system including remaining amount of material in the real material calling system via the server; and receiving status of task execution in real time from the real AGV via the server, wherein the real AGV scheduling controller and the virtual AGV scheduling controller communicate to the real AGV and the virtual AGV respectively only indirectly via the server, and the server comprises an adapter to convert AGV scheduling instruction in a common format issued by the AGV scheduling controller or the virtual AGV scheduling controller into a particular format of the real AGV or the virtual AGV respectively, and convert status feedback of the AGV or the virtual AGV back to the common format of the AGV scheduling controller or the virtual AGV scheduling controller respectively.

12. The method according to claim 11, wherein the real AGV comprises AGVs from a plurality of AGV manufacturers, wherein constructing the server further comprises:
constructing a plurality of adapters corresponding to the plurality of AGV manufacturers for providing adaptation between the real AGV and the real AGV scheduling controller.

13. The method according to claim 11, wherein the real AGV, the real AGV scheduling controller, the virtual AGV, and the virtual AGV scheduling controller have respective IP addresses and ports, and communicate with the server through the TCP/IP protocol.

14. The method according to claim 11, wherein simulating the AGV scheduling process further comprises:
configuring the virtual AGV scheduling controller to generate an AGV scheduling instruction;
configuring the virtual AGV to execute a task according to the AGV scheduling instruction; and
configuring the server to:
receive an AGV scheduling instruction from the virtual AGV scheduling controller and transmit the same to a corresponding virtual AGV; and
receive status feedback from the virtual AGV.

15. The method according to claim 14, wherein generating the AGV scheduling instruction further comprises:
storing a received task into a task table;
acquiring an idle virtual AGV from an AGV status list; and
assigning the task to the idle virtual AGV.

16. The method according to claim 14, wherein the virtual AGV scheduling controller is further configured to:
monitor the status fed back by an AGV during task execution, and send an alarm signal when the status is inconsistent with the expectation.

17. The method according to claim 11, wherein the virtual AGV scheduling controller is capable of scheduling a real AGV in the same manner as scheduling the virtual AGV.

18. The method according to claim 11, wherein the method further comprises:
constructing a virtual material calling system as a digital twin of a real material calling system based on simulation software, so that the program for controlling the virtual material calling system is equivalently exchangeable with the program for controlling the corresponding real material calling system, and the real material calling system and the virtual material calling system are communicatively coupled with the server respectively, and
simulating the AGV scheduling process further comprises:
receiving a task issued by the virtual material calling system and transmitting the same to the virtual AGV scheduling controller; and
transmitting the status fed back by the virtual AGV to the virtual material calling system.

19. An AGV scheduling control method, comprising:
receiving, by an AGV scheduling controller, a task via a server;
determining, by the AGV scheduling controller, an AGV for executing the task;
sending, by the AGV scheduling controller, a scheduling instruction for the AGV to the server;
converting, by the server, the scheduling instruction into a message format suitable for the AGV;
sending, by the server, the converted scheduling instruction to the AGV;
issuing, by a real material calling system communicatively coupled with the server, material calling tasks to the real AGV scheduling controller via the server, the material calling tasks including a loading task and an unloading task;
informing, by the real material calling system, the real AGV scheduling controller of status of the real material calling system including remaining amount of material in the real material calling system via the server; and
receiving, by the real material calling system, status of task execution in real time from the real AGV via the server,
wherein the server comprises an adapter to convert the scheduling instruction in a common format issued by the AGV scheduling controller into a particular format of the real AGV, and convert status feedback of the AGV back to the common format of the AGV scheduling controller.

20. The method according to claim 19, further comprising:
monitoring a running status of a corresponding object by a virtual AGV and a virtual AGV scheduling controller respectively serving as digital twins of the AGV and the AGV scheduling controller.

21. The method according to claim 19, further comprising:
simulating an AGV scheduling process through the virtual AGV, the virtual AGV scheduling controller and the server; and
optimizing the AGV scheduling algorithm based on the simulation result.

22. The method according to claim 19, wherein the task comprises a material calling task issued by a material calling system via the server.

23. The AGV scheduling control system according to claim 1, wherein the real AGV scheduling controller is configured to generate the AGV scheduling instruction partly based on the remaining amount of material in the real material calling system.

* * * * *